Jan. 23, 1934.  J. S. HOLMES  1,944,344
BRAKE TESTING DEVICE
Filed May 31, 1930
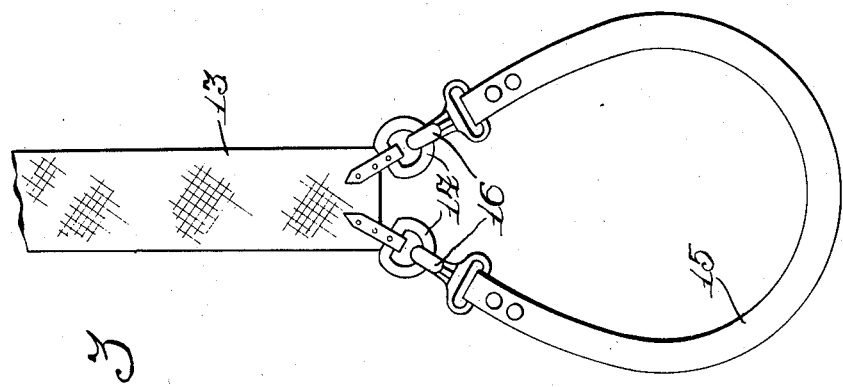
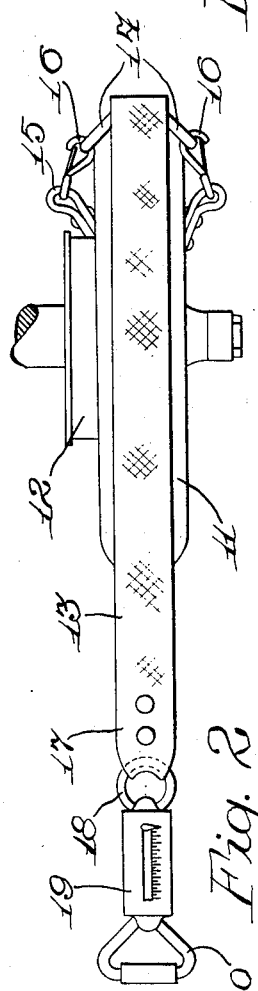
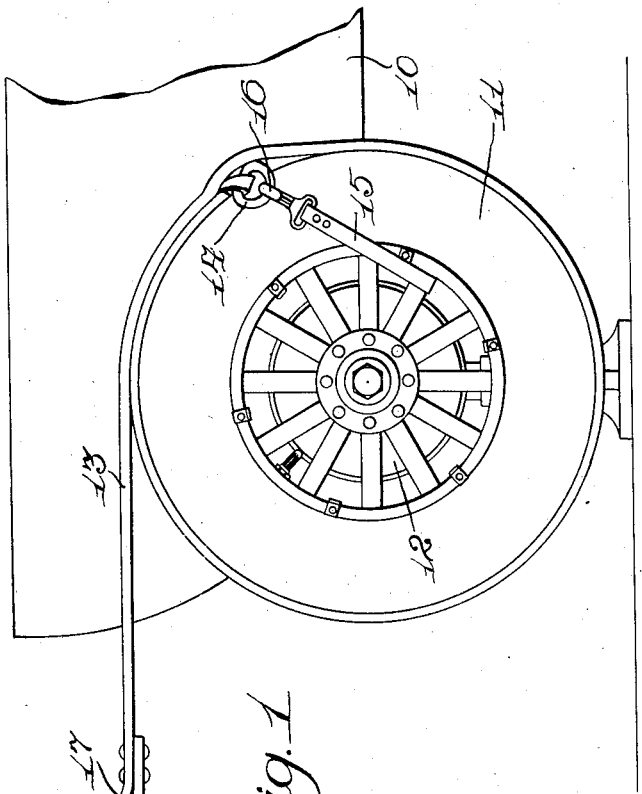
Inventor:
John S. Holmes.
By H. P. Darent
Atty.

Patented Jan. 23, 1934

1,944,344

UNITED STATES PATENT OFFICE 1,944,344

BRAKE TESTING DEVICE

John Sleeper Holmes, Chicago, Ill., assignor to International Harvester Company, a corporation of New Jersey Application May 31, 1930. Serial No. 458,000

5 Claims. (Cl. 265—1)

The invention relates to a brake testing device.

The brake tester comprises a suitable length of flexible band having detachably connected thereto at one end a strap, and at the other end a spring balance with a pull handle.

The object is to provide a simple and cheap brake testing device for use in connection with the adjustment of brakes as used in motor vehicles.

In the accompanying sheet of drawings illustrating this invention:

Figure 1 is a side view showing the brake tester and its manner of use;

Figure 2 is a plan view of the structure shown in Figure 1; and,

Figure 3 is a detail view of one end of the band.

In the drawing, a motor vehicle is generally shown at 10, the same having a wheel 11 with which is associated the usual brake 12.

The brake tester comprises a length of flexible belting 13 preferably made of canvas, said band carrying at one end a pair of eyelets 14 to which is connected a flexible connecter element in the form of a strap 15. The strap is formed in a loop, as shown in Figure 3, and is detachably connected to the eyelets by means of snap hooks 16. The other end of the band is formed with a loop 17 in which is fixed an eyelet 18, the eyelet in turn having connected thereto a conventional spring balance 19 provided with a pull handle 20.

In use, the vehicle is jacked up by means of a jack, to raise the wheel above the ground as shown in Figure 1, and the strap 15 is detachably connected to a part of the wheel, such for example as the spokes, as shown in Figure 1. The band is then wrapped around the wheel 11 in the manner shown with the other end of the band extending rearwardly and tangentially with respect to the wheel. As the band is preferably made of canvas sufficient friction exists between the band and the wheel tire to prevent slippage of the brake tester from the wheel. The brake pedal is then pressed down a predetermined distance to lock the brake just sufficiently to permit the wheel to turn by slippage. The user then grasps the handle 20 and pulls thereon in a tangential line relative to the wheel, which causes the wheel to rotate. Thereupon an indication will be shown on the spring balance, say, of 25 pounds. The opposite rear wheel will then be jacked up and similarly treated for a pull of 25 pounds. Thus the brake pressures on the rear two wheels may be set for the arbitrary 25 pounds pull, or whatever is decided to be correct, the result making it possible to adjust the two rear wheel brakes for an equalized braking action. Similarly, the front wheel brakes can be set for any desired action, which will probably be a little less than for the rear wheels. For example, the front wheels may be adjusted and set for an equalized braking pressure of 20 pounds to be indicated on the spring balance 19 in an obvious manner.

From this detailed description it will be apparent that a simple and inexpensive brake tester is provided by this invention, which is effective in use and achieves the desirable objects for which it is provided.

It is the intention to cover all such immaterial changes of the form of the tester herein shown for purposes of illustration as do not materially depart from the spirit of the invention which is defined in the appended claims.

What is claimed is:

1. A brake testing device comprising a flat flexible band, said band adapted for wrapping around a motor vehicle wheel and provided at one end with means for anchoring the same detachably to the wheel, the band having connected to its other end a spring balance provided with a pull handle.

2. A brake testing device comprising a flat flexible band, said band adapted for wrapping around a motor vehicle wheel and provided at one end with a strap adapted to be detachably anchored to the wheel, the band having connected to its other end a spring balance provided with a pull handle.

3. A brake testing device comprising a flat flexible band adapted for wrapping around a motor vehicle wheel tire, said band having a strap attached to one end thereof for anchoring the band to a part of the wheel, the band being of sufficient length to permit the opposite end thereof to overlap the anchored end of the band and to be extended out a distance along a substantially tangential line with respect to the wheel tire, and a spring balance connected to said last mentioned end of the band.

4. A brake testing device comprising a flat flexible band adapted for wrapping around a motor vehicle wheel tire, said band having means attached to one end thereof for detachable anchorage to a point of the wheel radially inward of its outer periphery, said band being of a length to permit the opposite end thereof to overlap the anchored end of the band and to be extended out a distance away from the wheel periphery to enable a straight line pull thereon to turn the wheel when the same is jacked up, and means connected to said pull end of the band to measure the force of pull applied.

5. A brake testing device for the brakes of rubber tired motor car wheels, said device comprising a flexible flat canvas band adapted to be wrapped around the tire and to frictionally grip the same, said band provided at one end with means for anchoring the same detachably to a part of the wheel, and a spring balance having a pull handle connected to the other end of the band.

JOHN SLEEPER HOLMES.